(12) United States Patent
Kurihara et al.

(10) Patent No.: US 7,503,942 B2
(45) Date of Patent: Mar. 17, 2009

(54) METHOD OF MAKING ELECTROCHEMICAL DEVICE

(75) Inventors: Masato Kurihara, Tokyo (JP); Satoshi Maruyama, Tokyo (JP)

(73) Assignee: TDK Corporation, Tokyo (JP)

( * ) Notice: Subject to any disclaimer, the term of this patent is extended or adjusted under 35 U.S.C. 154(b) by 931 days.

(21) Appl. No.: 10/935,233

(22) Filed: Sep. 8, 2004

(65) Prior Publication Data

US 2005/0081370 A1    Apr. 21, 2005

(30) Foreign Application Priority Data

Sep. 18, 2003    (JP) .......................... P2003-326752

(51) Int. Cl.
*H01M 10/04* (2006.01)
(52) U.S. Cl. .................................... 29/623.4
(58) Field of Classification Search ............... 29/623.3, 29/623.5; 429/324
See application file for complete search history.

(56) References Cited

U.S. PATENT DOCUMENTS 6,328,770 B1 * 12/2001 Gozdz ...................... 29/623.3
2002/0110739 A1 * 8/2002 McEwen et al. ............ 429/324
2003/0003369 A1 * 1/2003 Dai ........................... 429/324
2004/0094741 A1    5/2004 Sato et al.

FOREIGN PATENT DOCUMENTS

| JP | A 10-29742 | | 2/1998 |
| JP | 11-67230 | * | 3/1999 |
| JP | 2000-294285 | * | 10/2000 |
| JP | B2 3297034 | | 4/2002 |
| WO | WO 02/076924 A1 | | 10/2002 |

OTHER PUBLICATIONS

English Translation of JP 2000-311,712 (Iijima et al.) from Japanese Patent Office website. Corresponds to JP B2 3,297,034 (doc date Apr. 2002).*

* cited by examiner

*Primary Examiner*—Stephen J. Kalafut
(74) *Attorney, Agent, or Firm*—Oliff & Berridge, PLC

(57) ABSTRACT

In a method of making an electrochemical device including an electrochemical element comprising a pair of opposing electrode layers, a separator layer disposed between the pair of electrode layers, and an electrolyte existing between the pair of electrode layers; an ionic liquid is applied to at least one of the electrode and separator layers, and then the electrode and separator layers are laminated together.

6 Claims, 7 Drawing Sheets

Fig.4
(a)
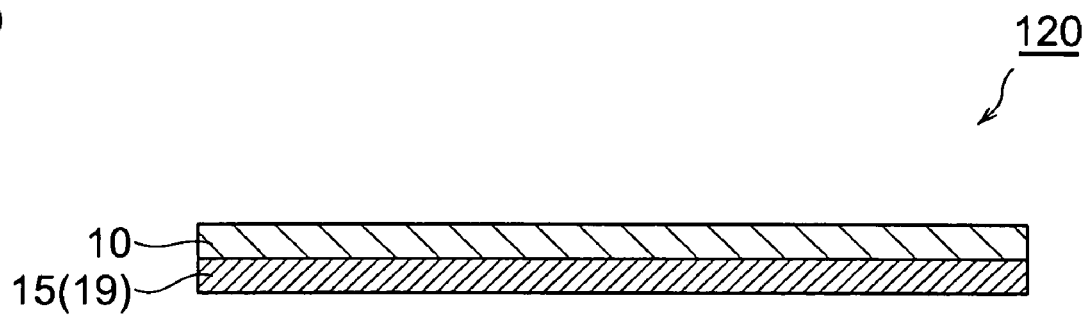
(b)
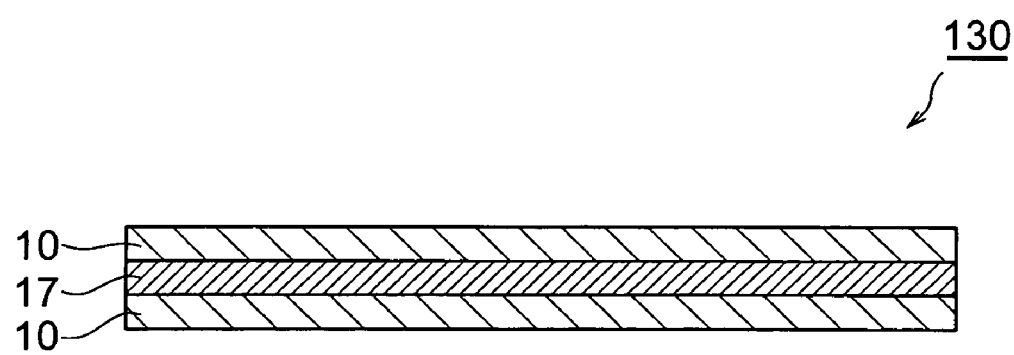
(c)
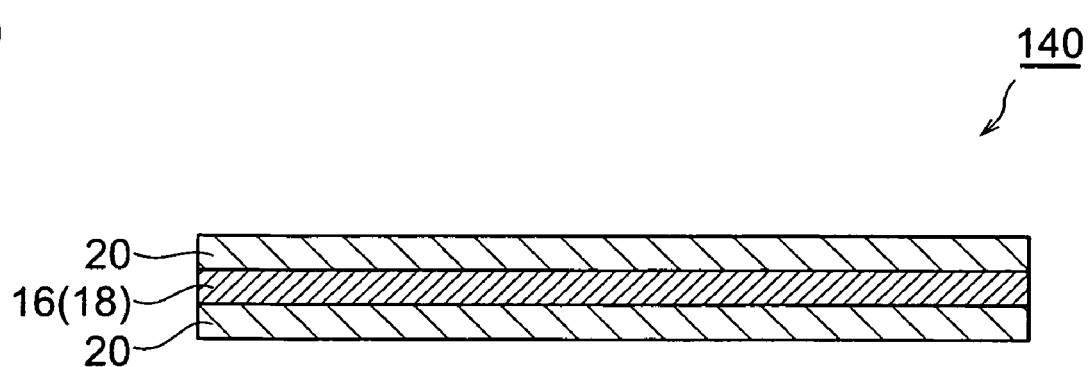

Fig.7

| | | FIXING METHOD | INITIAL CHARGING/DISCHARGING EFFICIENCY | INITIAL DISCHARGING CAPACITY | CYCLE CHARACTERISTIC |
|---|---|---|---|---|---|
| LITHIUM ION SECONDARY BATTERY | EXAMPLE 1 | IONIC LIQUID OF EXPRESSION (8) | 90.5 | 102 | 1300 |
| | EXAMPLE 2 | IONIC LIQUID OF EXPRESSION (9) | 91 | 103 | 1500 |
| | EXAMPLE 3 | IONIC LIQUID OF EXPRESSION (10) | 92 | 104 | 1700 |
| | EXAMPLE 4 | IONIC LIQUID OF EXPRESSION (11) | 92 | 104 | 1700 |
| | EXAMPLE 5 | IONIC LIQUID OF EXPRESSION (12) | 92 | 104 | 1750 |
| | COMPARATIVE EXAMPLE 1 | HOT-MELT ADHESIVE | 89.5 | 100 | 800 |
| | COMPARATIVE EXAMPLE 2 | NONE | 88.5 | 98 | 230 |
| ELECTRIC DOUBLE LAYER CAPACITOR | EXAMPLE 6 | IONIC LIQUID OF EXPRESSION (8) | | 103 | 99.8 |
| | EXAMPLE 7 | IONIC LIQUID OF EXPRESSION (9) | | 104 | 99.8 |
| | EXAMPLE 8 | IONIC LIQUID OF EXPRESSION (10) | | 106 | 99.9 |
| | EXAMPLE 9 | IONIC LIQUID OF EXPRESSION (11) | | 106 | 99.9 |
| | EXAMPLE 10 | IONIC LIQUID OF EXPRESSION (12) | | 106 | 99.9 |
| | COMPARATIVE EXAMPLE 3 | HOT-MELT ADHESIVE | | 100 | 99.2 |
| | COMPARATIVE EXAMPLE 4 | NONE | | 97 | 97.6 |

METHOD OF MAKING ELECTROCHEMICAL DEVICE

BACKGROUND OF THE INVENTION

1. Field of the Invention

The present invention relates to a method of making an electrochemical device; and, more specifically, to a method of making n electrochemical device encompassing batteries such as lithium ion secondary batteries and electrochemical capacitors such as electric double layer capacitors.

2. Related Background Art

Electrochemical devices represented by batteries such as lithium ion secondary batteries and electrochemical capacitors such as electric double layer capacitors are easy to reduce their size and weight, and thus are expected to become power supplies and backup power supplies for portable devices (small-size electronic devices) and auxiliary power supplies for hybrid cars, for example.

As the electronic devices further reduce their sizes, the electrochemical devices are desired to become thinner. Known as means for yielding such an electrochemical device which can be made thinner is a method of preparing structures each of which comprises a pair of electrode layers and a separator layer of a porous film disposed therebetween and is dipped in an electrolytic solution; thermocompression-bonding the structures together; and producing an electrochemical device from thus obtained electrochemical element (e.g., Japanese Patent Publication No. 3297034).

If the separator and electrode layers are to be laminated after being individually dipped in the electrolytic solution in such a manufacturing method, their alignment for lamination will be very difficult because of a decrease in the strength of the separator layers, etc. It is therefore considered important that the electrode and separator layers be partly bonded together with a hot-melt adhesive beforehand and then be dipped in the electrolytic solution and thermocompression-bonded together. One of reasons why the alignment must be done accurately is that, for example, lithium ions released from a positive electrode are deposited without being taken into a negative electrode in a lithium second battery and thus lower the battery capacity unless the negative electrode opposes the whole surface of the positive electrode.

SUMMARY OF THE INVENTION

When the positive electrode, negative electrode, and separator are temporarily bonded with a hot-melt adhesive, however, electrode layer parts having the adhesive attached thereto remain after thermocompression bonding and fail to function as an electrochemical device, whereby the energy capacity of the whole device decreases. Also, the adhesive increases the thickness of the bonded part, thus yielding a physical obstacle. This makes it hard to apply pressure uniformly to the separator and electrode layers at the time of thermocompression bonding, thereby deteriorating durability during a long cycle or at the time of high-rate charging. In view of these problems, it is an object of the present invention to provide a method of making an electrochemical device having a large energy capacity and an excellent durability.

The present invention provides a method of making an electrochemical device including an electrochemical element comprising a pair of opposing electrode layers, a separator layer disposed between the pair of electrode layers, and an electrolyte existing between the pair of electrode layers; the method comprising the steps of applying an ionic liquid to at least one of the electrode and separator layers, and then laminating the electrode and separator layers.

The ionic liquid has a high viscosity and thus can temporarily bond the electrode and separator layers in a favorable manner in the method of making an electrochemical device in accordance with the present invention. Then, by way of a dipping step of dipping the temporarily bonded electrode and separator layers into an electrolytic solution, a laminate containing the electrolytic solution can be formed in an accurately aligned state.

When the laminate is immersed with the electrolytic solution, the applied ionic liquid is diffused into the electrolytic solution, whereby the electrode layers are free of parts which fail to function as an electrochemical device. Therefore, an electrochemical device having a sufficiently large energy capacity can be obtained. Since the ionic liquid is diffused, the physical obstacle caused by the thickness of the applied part of the ionic liquid is reduced. As a consequence, a pressure can be applied more uniformly when subsequently carrying out a thermocompression bonding step of thermocompression-bonding the pair of electrode layers and the separator layer, whereby an electrochemical element having a more uniform layer thickness can be obtained. This makes it possible to produce an electrochemical device excellent in durability in so-called heavy load states such as long cycles and high-rate charging.

Preferably, the ionic liquid has a viscosity of 35 to 630× $10^{-3}$ Pa·s. This can temporarily bond the pair of electrode layers and the separator layer in a favorable manner.

Preferably, the ionic liquid is a salt containing a quaternary ammonium cation. The salt containing a quaternary ammonium cation has a high viscosity and thus can temporarily bond the electrode and separator layers in a favorable fashion. Also, this salt is diffused well in the dipping step, whereby the electrochemical device can be made favorably.

Examples of the quaternary ammonium cation include a cation having a structure of $R_4N^+$ (where R is an organic group), pyrrolidinium cation, piperidinium cation, imidazolium cation, and pyridinium cation. These cations exhibit a high ionic conductivity at room temperature, and thus can produce an electrochemical device having a high electroconductivity.

Preferably, the ionic liquid is a salt containing a trifluoromethanesulfonyl imide anion (TFSI). TFSI is less reactive with water, and thus can be handled in the air.

Preferably, at least one of the pair of electrode layers contains a lithium compound, whereas the ionic liquid contains a lithium ion. This can raise the lithium ion concentration, thereby improving the lithium ion conductivity. When the electrochemical device is a lithium ion secondary battery, for example, an excellent output characteristic can be obtained since the lithium ion is used as a carrier for carrying electric energy.

The present invention can yield an electrochemical device having a large energy capacity and an excellent durability.

BRIEF DESCRIPTION OF THE DRAWINGS

FIG. 4 is sectional views of constituent members of the lithium ion secondary battery, i.e., (a) is a sectional view of a two-layer laminate for producing a laminate structure 85 of the lithium ion secondary battery of FIG. 1, (b) is a sectional view of a cathode three-layer laminate for producing the laminate structure 85 of the lithium ion secondary battery of FIG. 1, and (c) is a sectional view of an anode three-layer laminate for producing the laminate structure 85 of the lithium ion secondary battery of FIG. 1;

FIG. 7 is a table showing charging/discharging characteristic evaluations of lithium ion secondary batteries in accordance with Examples 1 to 5 and Comparative Examples 1 and 2, and electric double layer capacitors in accordance with Examples 6 to 10 and Comparative Examples 3 and 4.

DESCRIPTION OF THE PREFERRED EMBODIMENTS

In the following, preferred embodiments of the electrochemical device in accordance with the present invention will be explained in detail with reference to the drawings. In the following explanation, parts identical or equivalent to each other will be referred to with numerals identical to each other without repeating their overlapping descriptions.

First Embodiment

First, a preferred embodiment in a case where the electrochemical device of the present invention is employed in a lithium ion secondary battery will be explained in detail.

Figure 1:
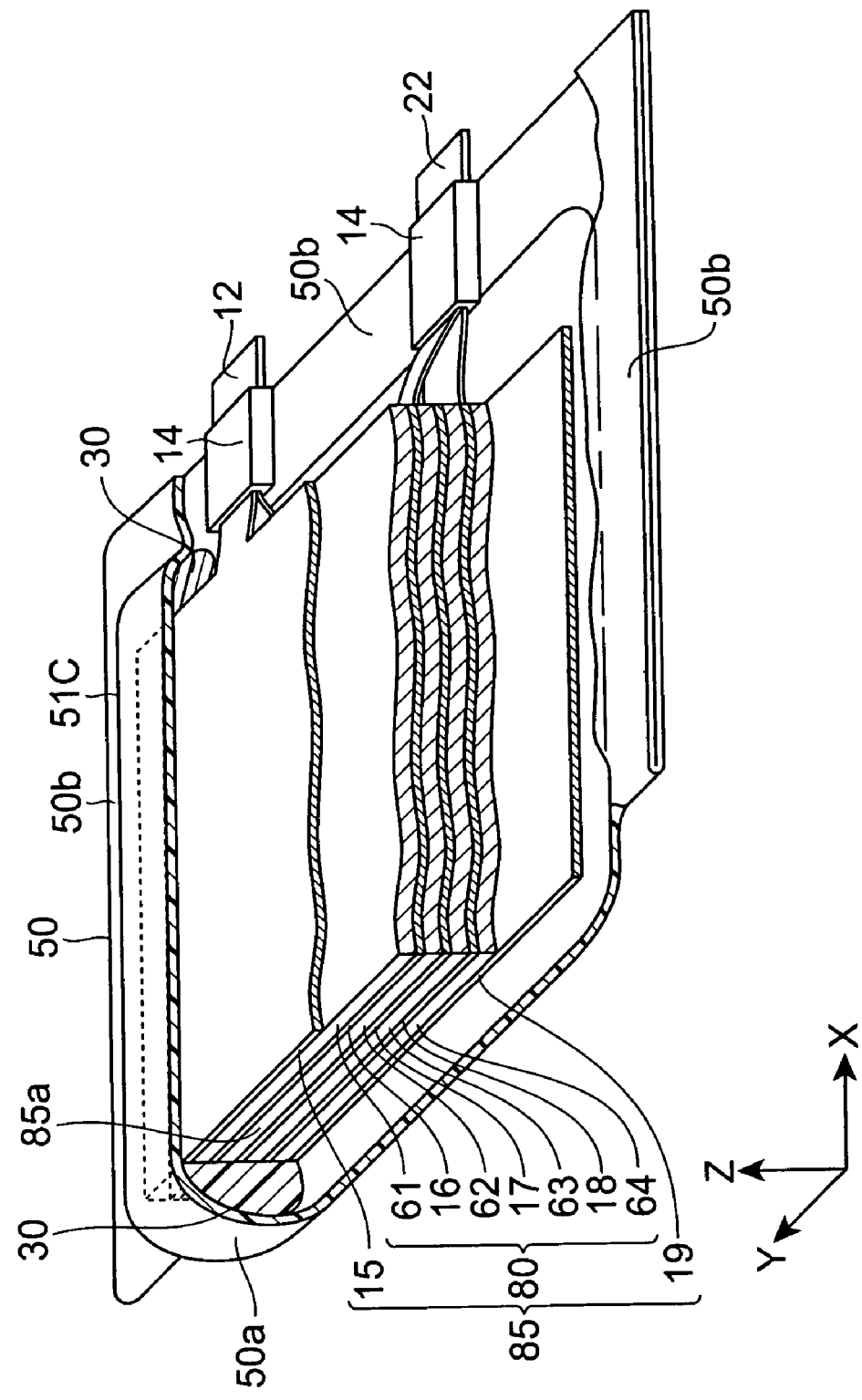
FIG. 1 is a partly broken perspective view of the lithium ion secondary battery in accordance with a first embodiment.
Figure 2:
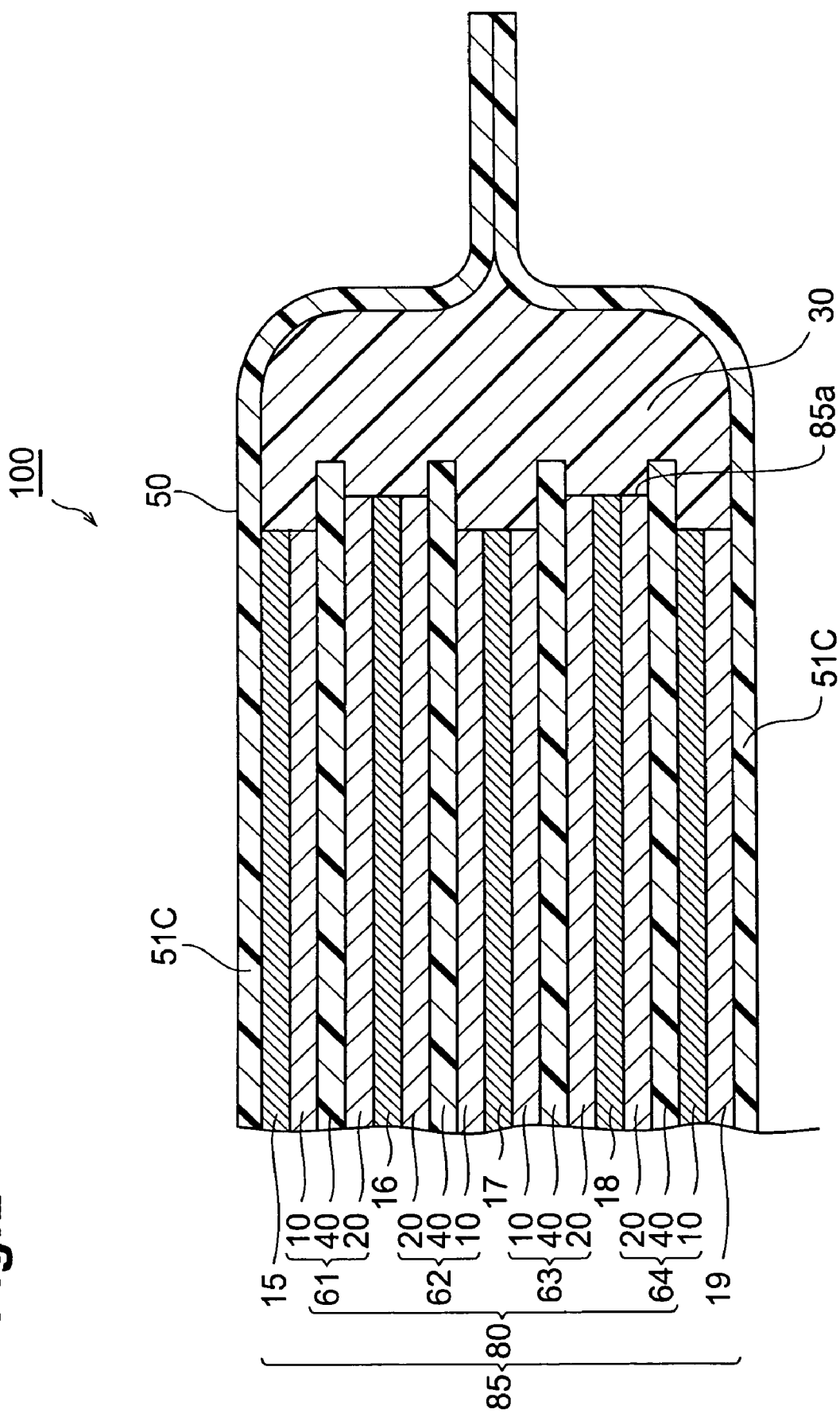
FIG. 2 is a sectional view of the lithium ion secondary battery taken along the YZ plane of FIG. 1.

FIG. 1 is a partly broken perspective view showing a lithium ion secondary battery 100 as an electrochemical device in accordance with the first embodiment of the present invention. FIG. 2 is a YZ-sectional view of FIG. 1, whereas FIG. 3 is an XZ-sectional view of FIG. 1.

Figure 3:
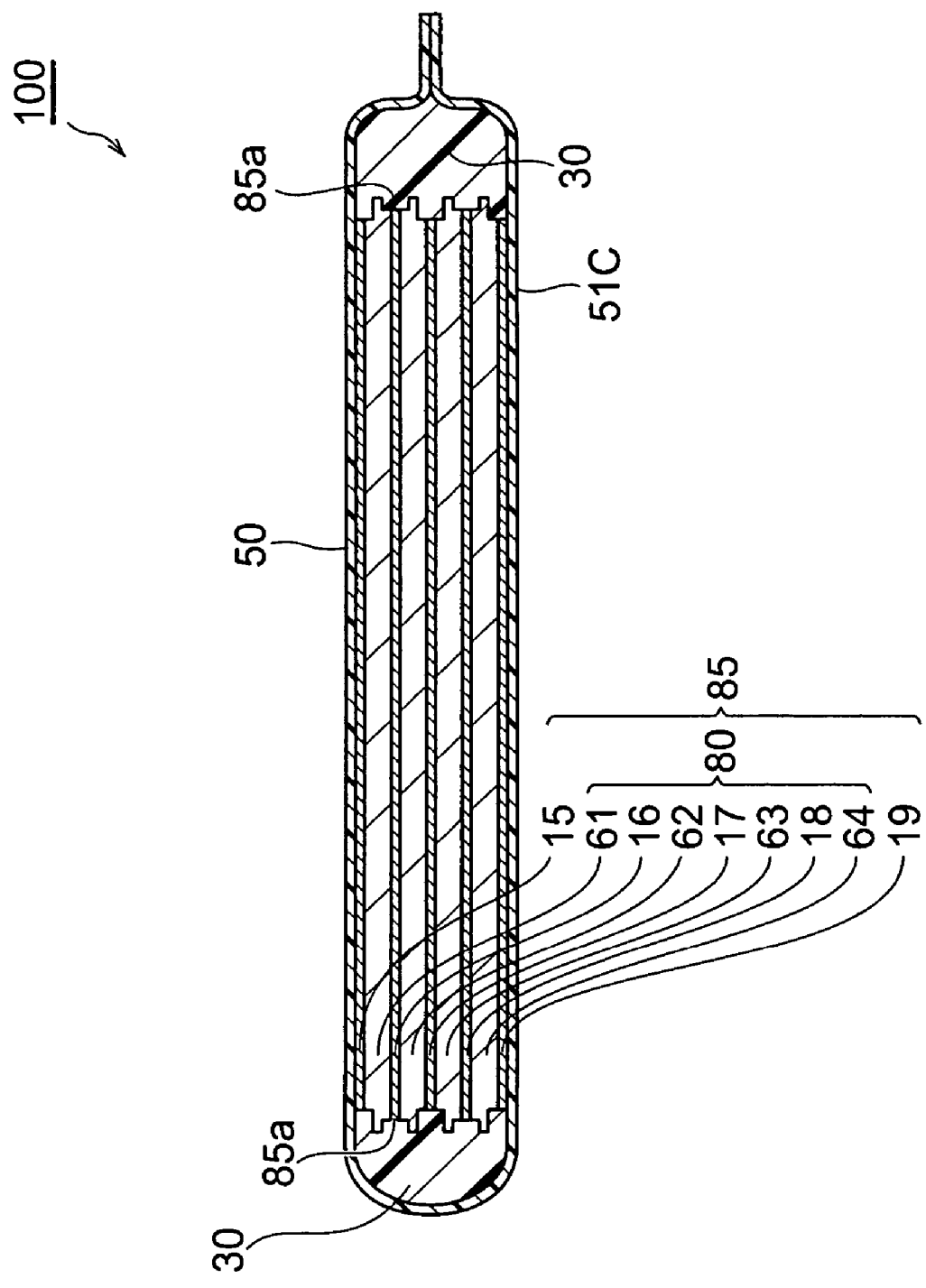
FIG. 3 is a sectional view of the lithium ion secondary battery taken along the XZ plane of FIG. 1.

As shown in FIGS. 1 to 3, the lithium ion secondary battery 100 in accordance with this embodiment is mainly constituted by a laminate structure 85, a case 50 which accommodates the laminate structure 85 in a closed state, and lead conductors 12 and 22 for connecting the laminate structure 85 to the outside of the case 50. The laminate structure 85 comprises a laminate 80, and collector terminal layers 15 and 19 which hold the laminate 80 from both sides in the laminating direction (vertical direction) of the laminate 80.

The laminate 80 comprises planar elements (electrochemical elements) 61 to 64, a planar collector layer 16 disposed between the elements 61 and 62, a planar collector layer 17 disposed between the elements 62 and 63, and a planar collector layer 18 disposed between the elements 63 and 64.

As shown in FIG. 2, each of the elements 61 to 64 is constituted by a planar cathode 10 (electrode layer) and a planar anode 20 (electrode layer) which oppose each other, a planar electrically insulating separator layer 40 disposed between the cathode 10 and anode 20 so as to be adjacent thereto, and an electrolytic solution (not depicted) including an electrolyte contained in the cathode 10, anode 20, and separator layer 40. Anodes 20 are disposed on both sides of the collector layer 16. Cathodes 10 are disposed on both sides of the collector layer 17. Anodes 20 are disposed on both sides of the collector layer 18. Here, for convenience of explanation, the anode and cathode are determined with reference to the polarities of the lithium ion secondary electrode 100 at the time of discharging. When charging the lithium ion secondary electrode 100, electric charges flow in a direction opposite from that at the time of discharging, whereby the anode and cathode replace each other.

When each matrix is seen in the laminating direction, the separator layer 40, anode 20, and cathode 10 successively decrease their areas, and are arranged such that the cathode 10 is included within the area of the anode 20, and the anode 20 is included within the area of the separator layer 40. When seen in the laminating direction, the collector terminal layers 15, 19 and collector layer 17 are arranged at the same position with the same size as with the cathode 10, and the collector layers 16, 18 are arranged at the same position with the same size as with the anode 20. The separator layers 40 are arranged at the same position.

The anodes 20 are layers obtained by the steps of applying a solvent containing an anode active material, a conductive auxiliary agent, a binder, and the like to the collector layers 16 and 18, and drying thus applied solvent.

The anode active material is not restricted in particular as long as it can reversibly occlude and release lithium ions, desorb and insert lithium ions, and dope and undope lithium ions with their counter anions (e.g., $ClO_4^-$). Materials used in known lithium ion secondary batteries can be used as the anode active material. For example, carbon materials such as natural graphite and synthetic graphite (non-graphitizing carbon, graphitizing carbon, carbon fired at a low temperature, etc.), metals such as Al, Si, and Sn which are combinable with lithium, amorphous compounds mainly composed of oxides such as $SiO_2$ and $SnO_2$, and lithium titanate ($Li_4Ti_5O_{12}$) can be used.

The conductive auxiliary agent is not restricted in particular as long as it allows the anode 20 to have a better conductivity, whereby known conductive auxiliary agents can be used. For example, carbon blacks, carbon materials, metal fine powders such as copper, nickel, stainless steel, and iron, mixtures of carbon materials and metal fine powders, and conductive oxides such as ITO can be used.

The binder is not restricted in particular as long as it can bind a particle of the anode active material and a particle of the conductive auxiliary agent to the collector layers 16 and 18, whereby known binders can be used. Examples of the binder include fluorine resins such as polyvinylidene fluoride (PVDF), polytetrafluoroethylene (PTFE), tetrafluoroethylene/hexafluoropropylene copolymer (FEP), tetrafluoroethylene/perfluoroalkylvinyl ether copolymer (PEA), ethylene/tetrafluoroethylene copolymer (ETFE), polychlorotrifluoroethylene (PCTFE), ethylene/chlorotrifluoroethylene copolymer (ECTFE), and polyvinyl fluoride (PVF). In particular, those which can be turned into a gel by the electrolytic solution are preferred as the binder.

Preferably, the anode 20 contains an electronically conductive particle. Examples of the electronically conductive particle include carbon black such as acetylene black and Ketjenblack.

The collector layers 16 and 18 to which the solvent containing the anode active material, the conductive auxiliary agent, the binder, and the like is applied is made of any metal without any restriction in particular as long as it is suitable for anodes of known secondary batteries. An example of the metal is copper.

The cathode 10 is obtained by applying a solvent containing a cathode active material, a conductive auxiliary agent, a binder, and the like to the collector terminal layers 15, 19 and collector layer 17, and drying thus applied solvent.

The cathode active material is not restricted in particular as long as it can reversibly occlude and release lithium ions, desorb and insert (intercalate) lithium ions, or dope and undope lithium ions with their counter anions (e.g., $ClO_4^-$), whereby known electrode active materials can be used. Examples of the cathode active material include mixed metal oxides such as lithium cobaltate ($LiCoO_2$), lithium nickelate ($LiNiO_2$), lithium manganese spinel ($LiMn_2O_4$), and mixed metal oxide represented by a general formula of $LiNi_xCo_yMn_zO_2$ (x+y+z=1), a lithium vanadium compound ($LiV_2O_5$), olivine type $LiMPO_4$ (where M is Co, Ni, Mn, or Fe), and lithium titanate ($Li_4Ti_5O_{12}$).

As individual constituents other than the cathode active material contained in the cathode 10, those constituting the anode 20 can be used. The cathode 10 can also contain electronically conductive particles as with the anode 20.

The collector terminal layers 15, 19 and collector layer 17 to which the solvent containing the cathode active material, the conductive auxiliary agent, the binder, and the like is applied is made of any metal without any restriction in particular as long as it is suitable for cathodes of known secondary batteries. An example of the metal is aluminum.

The separator layer 40 disposed between the anode 20 and the cathode 10 is not restricted in particular as long as it is formed from an electrically insulating porous body, whereby a separator layer employed in known lithium ion secondary batteries can be used. Examples of the electrically insulating porous body include a laminate of films made of polyethylene, polypropylene, or polyolefin, an extended film of mixtures of the resins mentioned above, and fibrous nonwoven constituted by at least one species of constituent material selected from the group consisting of cellulose, polyester, and polypropylene.

The electrolytic solution is contained within the anode 20, the cathode 10, and pores of the separator layer 40. The electrolytic solution is not restricted in particular, and electrolytic solutions (aqueous electrolytic solutions and electrolytic solutions using organic solvents) used in known lithium ion secondary batteries can be employed. However, aqueous electrolytic solutions electrochemically have a low decomposition voltage, so that its tolerable voltage at the time of charging is limited to a low level. Therefore, electrolytic solutions (nonaqueous electrolytic solutions) using organic solvents are preferably employed. As an aqueous electrolytic solution of a lithium ion secondary battery, one in which a lithium salt is dissolved in a nonaqueous solvent (organic solvent) is used. Examples of the lithium salt include salts such as $LiPF_6$, $LiClO_4$, $LiBF_4$, $LiAsF_6$, $LiCF_3SO_3$, $LiCF_3CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, and $LiN(CF_3CF_2CO)_2$. These salts may be used one by one or in combinations of two or more. The electrolytic solution contains an anion and a cation which constitute an ionic liquid explained later.

In this embodiment, the electrolytic solution may be not only a liquid but also a gel-like electrolyte obtained by adding a gelling agent thereto. A solid electrolyte (a solid polymer electrolyte or an electrolyte made of an ionically conductive inorganic material) may be contained as well.

As shown in FIGS. 1 to 3, end faces 85a of the laminate structure 85 including the laminate 80 are sealed with a seal part 30. The seal part 30 prevents the electrolytic solution from leaking from the elements 61 to 64.

Here, the collector terminal layer 15 is formed between the inner face of a sheet 51C forming the case 50 of the lithium ion secondary battery 100 and the element 61, whereas the collector terminal layer 19 is formed between the inner face of the sheet 51C of the case 50 and the element 64.

The case 50 is not restricted in particular as long as it can hermetically seal the laminate structure 85, so as to prevent air and moisture from entering the inside of the case. Cases used in known lithium ion secondary batteries can be used. For example, a synthetic resin such as epoxy resin, a sheet of a metal such as aluminum laminated with a resin can be used. As shown in FIG. 1, the case 50 is formed by folding a rectangular flexible sheet 51C in two at substantially the longitudinal center part, and holds the laminate structure 85 from both sides in the laminating direction (vertical direction) of the laminate structure 85. Among end parts of the sheet 51C folded in two, seal parts 50b in three sides excluding the turned part 50a are bonded by heat sealing or with an adhesive, whereby the laminate structure 85 is hermetically sealed therein.

One end of the lead conductor 12 is electrically connected to the collector terminal layers 15, 19 and collector layer 17, whereas one end of the lead conductor 22 is electrically connected to the collector layers 16 and 18, both of these ends extending to the outside of the case 50. As the lead conductors 12, 22, conductive materials such as aluminum and nickel can be used, for example. In this embodiment, the lead conductors 12 and 22 become positive and negative electrodes, respectively.

As shown in FIG. 1, the lead conductors 12 and 22 are coated with respective insulators 14 in order to improve sealability at the seal part 50b of the case 50. The seal part 50b of the case 50 seals the lead conductors 12 and 22 so as to hold the insulators 14, 14. Here, since there is no fear of short-circuiting with the case 50, operations are possible even without the insulators 14.

The material for the insulators 14 is not limited in particular. For example, they may be formed from a synthetic resin.

An example of the method of making the lithium ion secondary battery 100 will now be explained.

First, respective coating liquids (slurries) containing constituent materials for forming electrode layers to become the anode 20 and cathode 10 are prepared. The anode coating liquid is the solvent containing the anode active material, the conductive auxiliary agent, the binder, and the like, whereas the cathode coating liquid is the solvent containing the cathode active material, the conductive auxiliary agent, the binder, and the like. The solvent used in the coating liquid is not restricted in particular as long as it can dissolve the binder and disperse the active material and conductive auxiliary agent. For example, N-methyl-2-pyrrolidone and N,N-dimethylformamide can be used.

Subsequently, metal plates for use in the collector terminal layers 15, 19, anode collector layers 16, 18, and cathode collector layer 17 are prepared. Then, the cathode coating liquid is applied to one side of the collector terminal layer 15 and one side of the collector terminal layer 19, and is dried, so as to form cathodes 10, thereby yielding a two-layer laminate 120 shown in (a) of FIG. 4. Similarly, the cathode coating liquid is applied to both sides of the collector layer 17, and is dried, so as to form cathodes 10, thereby yielding a cathode three-layer laminate 130 shown in (b) of FIG. 4. On the other hand, the anode coating liquid is applied to both sides of the collector layer 16 and both sides of the collector layer 18, and dried, so as to form anodes 20, thereby yielding an anode three-layer laminate 140 shown in (c) of FIG. 4. Here, techniques for applying the coating liquids to the collector terminal layers and collector layers are not restricted in particular, and can appropriately be determined according to materials, forms, and the like of the collector terminal layers and collector layers. Examples of the techniques include metal mask printing, electrostatic coating, dip coating, spray coating, roll coating, doctor blading, gravure coating, and screen printing. After the coating, extending is carried out by flat pressing, calender rolling, or the like when necessary.

Each of the metal plates used for the collector terminal layers 15, 19 and the collector layers 16, 17, 18 has a rectangular form. Each of the rectangles of the metal plates used for the cathode collector layer 17 and the collector terminal layers 15, 19 is made smaller than each of the rectangles of the metal plates used for the anode collector layers 16, 18.

Subsequently, in the two-layer laminate 120 shown in (a) of FIG. 4, the cathode three-layer laminate 130 shown in (b) of FIG. 4, and the anode three-layer laminate 140 shown in (c) of FIG. 4, an ionic liquid 90 is applied to the surface having the anode 20 or cathode 10 as shown in (a) of FIG. 5 in this embodiment. Then, these laminates are stacked so as to alternate with the separator layers 40 in the order shown in (a) of FIG. 5, i.e., in the order of the two-layer laminate 120/separator 40/anode three-layer laminate 140/separator layer 40/cathode three-layer laminate 130/separator layer 40/anode three-layer laminate 140/separator layer 40/two-layer laminate 120, thus yielding a laminate structure 84 shown in (b) of FIG. 5.

Figure 5:
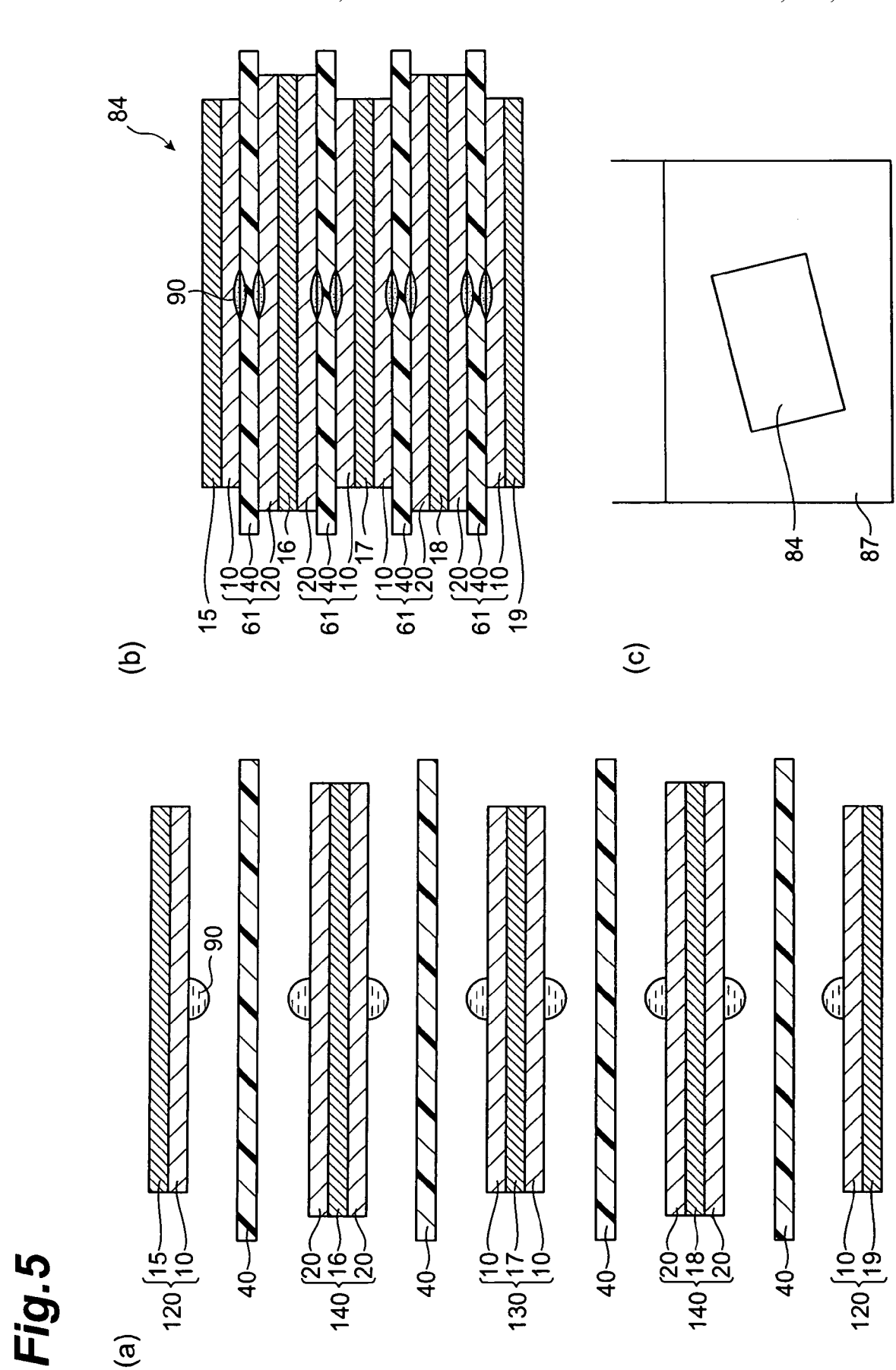
FIG. 5 is respective sectional views in the process of producing the laminate structure 85 of the lithium ion secondary battery of FIG. 1.

Here, as shown in (a) of FIG. 5, the layers are arranged such that the cathode three-layer laminate 130 and the two-layer laminate 120 are included within the anode three-layer laminate 140, and the anode three-layer laminate 140 is included within the separator 40 as seen in the laminating direction. Consequently, as shown in (b) of FIG. 5, the anodes 20 of the anode three-layer laminate 140 totally oppose their corresponding surfaces of the cathodes 10 of the cathode three-layer laminate 130, whereas the separator layers 40 totally oppose their corresponding surfaces of the cathodes 10 of the cathode three-layer laminate 130 and the anodes 20 of the anode three-layer laminates 140, whereby lithium ions released from positive electrodes (i.e., cathodes 10) are favorably taken into negative electrodes (i.e., anodes 20) by way of the separator layers 40. If the layers are not arranged accurately, lithium ions not taken into the negative electrodes may be deposited and fail to act as a carrier of electric energy, whereby the energy capacity of the battery may decrease. In electrochemical devices other than lithium ion secondary batteries, the individual layers may be in different sizes and arrangement.

Here, the ionic liquid 90 has such a high viscosity that it can temporarily bond the two-layer laminates 120, cathode three-layer laminate 130, anode three-layer laminates 140, and separator layers 40 in a favorable manner. Preferably, for favorable temporary bonding, the viscosity of the ionic liquid is 35 to $630 \times 10^{-3}$ Pa·s. Though the ionic liquid 90 may be applied to the whole surface of the anode 20 or cathode 10, it will be preferred if only the center part of each layer is temporarily bonded to such an extent that no displacement occurs. Instead of being applied onto the anodes 20 and cathodes 10, the ionic liquid may be applied onto the separator layers 40 opposing the anodes 20 and cathodes 10, or onto each of the separator layers 40, anodes 20, and cathodes 10, as long as temporary bonding can be achieved as shown in (b) of FIG. 5.

Then, as shown in (c) of FIG. 5, the laminate structure 84 is dipped into an electrolytic solution 87. Here, since the two-layer structures 120, cathode three-layer laminate 130, anode three-layer laminates 140, and separator layers 40 are temporarily bonded with the ionic liquid 90, the laminate structure 84 is immersed with the electrolytic solution 87 while in a state where the layers are aligned accurately.

The ionic liquid used in this embodiment is also referred to as an ambient-temperature molten salt, which is a liquid at ambient temperature, i.e., a salt having a melting point lower than room temperature. Known as an example of such an ionic liquid is a salt which is a combination of an organic cation and an anion. A specific example of the organic cation is a quaternary ammonium cation in which hydrogen in $NH_4^+$ is totally substituted with organic groups. An ionic liquid containing a quaternary ammonium cation can temporarily bond the two-layer structures 120, cathode three-layer laminate 130, anode three-layer laminates 140, and separator layers 40 in a favorable manner, and allows the electrolytic solution 87 to be diffused favorably after the dipping, whereby the lithium ion secondary battery can be produced favorably.

An example of the quaternary ammonium cation is the cation represented by general formula (1):

(1)

In the above-mentioned general formula (1), $R^1$, $R^2$, $R^3$, and $R^4$ are alkyl groups each having a carbon number of 1 to 10, whose hydrogen may be substituted with an alkoxy group. They may be either identical or different from each other.

Another example of the quaternary ammonium cation is the pyrrolidinium cation represented by general formula (2):

(2)

Still another example of the quaternary ammonium cation is the piperidinium cation represented by general formula (3):

(3)

Still another example of the quaternary ammonium cation is the imidazolium cation represented by general formula (4):

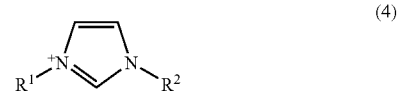

(4)

Still another example of the quaternary ammonium cation is the pyridinium cation represented by general formula (5):

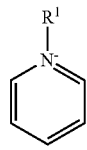
(5)

Each of the cations represented by general formulas (1) to (5) exhibits a high ionic conductivity at room temperature, and thus can produce an electrochemical device having a high electric conductivity.

Examples of the organic cation contained in the ionic liquid include not only the quaternary ammonium cation, but also cations represented by general formulas (6) and (7):

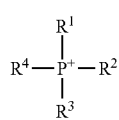
(6)

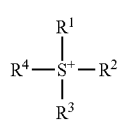
(7)

Examples of the anion contained in the ionic liquid include $BF_4^-$, $PF_6^-$, $CF_3SO_3^-$, $AsF_6^-$, $ClO_4^-$, $(RSO_2)_3C^-$, $(RSO_2)_2N^-$, $(CF_3SO_2)_2N^-$, and $RSO_3^-$, where R is a perfluoroalkyl group having a carbon number of 1 to 3, and a plurality of R may be identical or different from each other when present.

Preferably, the anion contained in the ionic liquid is a trifluoromethanesulfonyl imide anion (TFSI) represented by $(CF_3SO_2)_2N^-$. TFSI is less reactive with water, and thus can be handled in the air.

Preferably, at least one of the pair of electrode layers contains a lithium compound, whereas the ionic liquid contains a lithium ion. This can raise the lithium ion concentration, thereby improving the lithium ion conductivity. Since the lithium ion is used as a carrier for carrying electric energy, an excellent output characteristic can be obtained in a lithium ion secondary battery. Examples of the lithium salt which may be contained in the ionic liquid are the lithium compounds mentioned above in connection with the electrolytic solution.

Subsequently, end faces 85a of the laminate structure 85 are sealed with the seal part 30.

An example of a method of making the case 50 will now be explained. First, as shown in (a) of FIG. 6, a rectangular sheet 51B in which aluminum is laminated with epoxy resin is prepared.

Next, the sheet 51b is folded along the dotted line at the center thereof. Subsequently, as shown in (b) of FIG. 6, only seal parts 50b, 50b on two sides are heat-sealed by a desirable seal width under a predetermined heating condition with a sealer or the like, for example. This yields a bag-like case 50f formed with an opening 50c for introducing the laminate structure 85.

Then, the laminate structure 85 having the lead conductors 12 and 22 electrically connected thereto is inserted into the case 50f in a state formed with the opening 50c. Subsequently, as shown in (c) of FIG. 6, the air is evacuated from the case 50f via the opening 50c within a vacuum container 180, so that a vacuum state is attained within the case 50f. Then, while each of the lead conductors 12 and 22 partly projects out of the case 50f, a sealer 82 is used for sealing the opening 50c of the case 50f.

Figure 6:
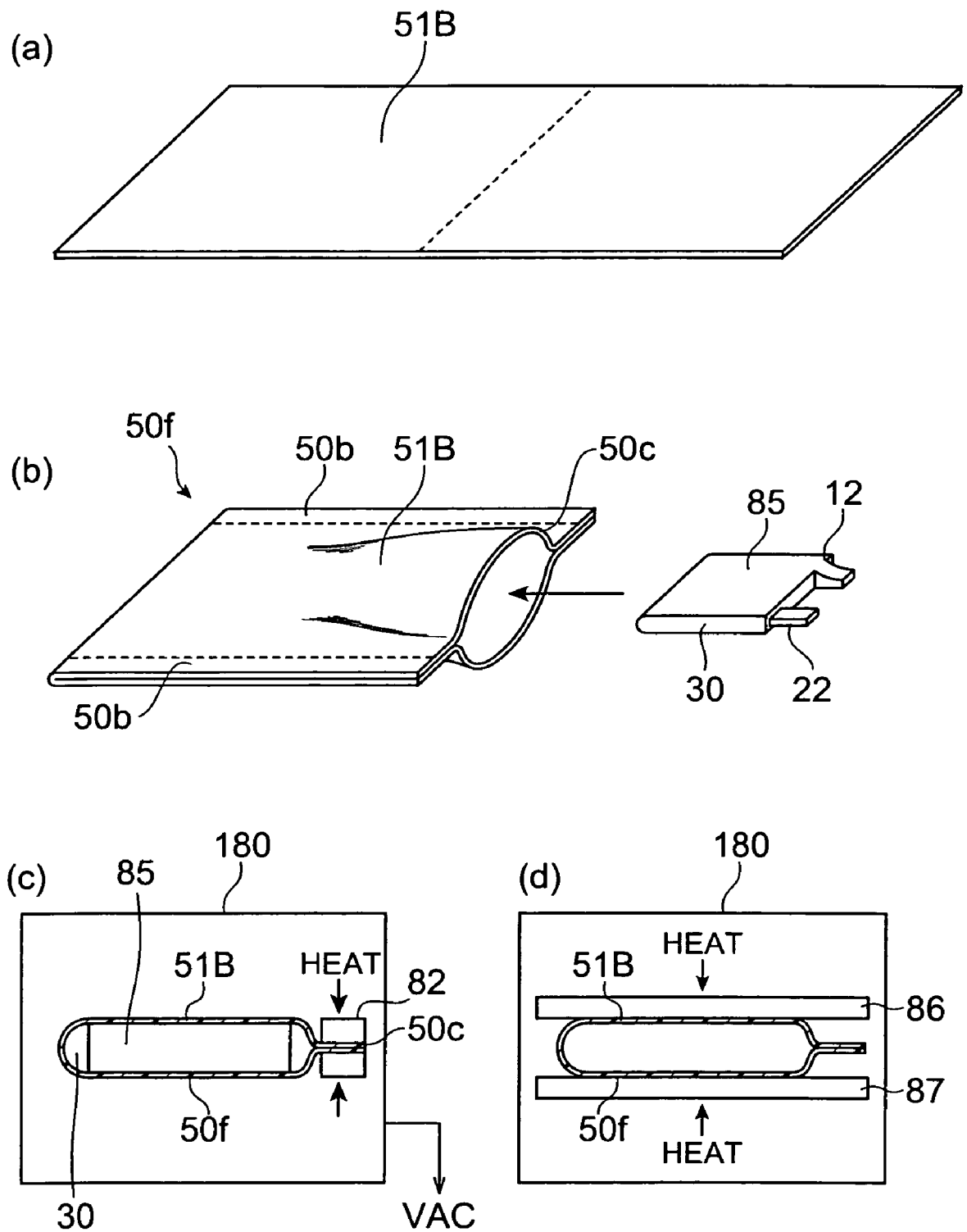
FIG. 6 is perspective views successively showing a method of making a case of the electric double layer capacitor of FIG. 1, i.e., (a) and (b) are perspective views successively showing the method of making the case of the electric double layer capacitor of FIG. 1, and (c) and (d) are schematic views subsequent to (b) in succession.

Finally, as shown in (d) of FIG. 6, the sheet 51B of the case 50f is thermally pressed at a temperature of 70 to 90° C. with pressers 86, 87 within the vacuum container 180, whereby the making of the lithium ion secondary battery 100 is completed. As a consequence, the laminate structure 85 is thermocompression-bonded with the sheet 51B. Since the ionic liquid 90 is diffused within the electrolytic solution here, the electrode layers are free of parts failing to function as an electrochemical device. Therefore, the lithium ion secondary battery 100 having a sufficiently large energy capacity can be obtained. Since the diffusion eliminates physical obstacles caused by the thickness of the ionic liquid applied part, the pressure can be exerted more uniformly at the time of thermal pressing, whereby the laminate structure 85 having a more uniform layer thickness can be obtained. This yields the lithium ion secondary battery 100 excellent in durability in so-called heavy load states such as long cycles and high-rate charging.

Though the laminate structure 85 has four elements in this embodiment, it may have more or less elements or a single layer. When a plurality of devices exist, layers must be arranged such that collectors between the elements are held with an anode or cathode.

Second Embodiment

A preferred embodiment of a case where the electrochemical device of the present invention is employed in an electric double layer capacitor will now be explained in detail. The electric double layer capacitor in accordance with this embodiment differs from the lithium ion secondary battery in that the anodes 10 and cathodes 20 are made of a porous layer which constitutes a polarizable electrode such as carbon electrode.

Without being restricted in particular, the same materials as those constituting polarizable electrodes used in known electric double layer capacitors can be used as constituent materials for the anodes 20 and cathodes 10. For example, one made of a constituent material mainly composed of a carbon material (e.g., activated carbon) obtained by activating coking coal (e.g., petroleum coke made by a delayed coker using bottom oils from fluidized catalytic crackers for petroleum type heavy oils or residual oils of vacuum distillators as a material oil) can be used. The other conditions (species and contents of constituents such as binder other than the carbon material) are not restricted in particular. For example, a conductive auxiliary agent (e.g., carbon black) for imparting conductivity to the carbon powder and a binder (polytetrafluoroethylene) may be added to the material.

A method of making the electric double layer capacitor differs from that of making a lithium ion secondary battery in accordance with the first embodiment in the method of producing the anodes 20 and cathodes 10.

When the anodes 20 and cathodes 10 are carbon electrodes (polarizable electrodes), sheet-like electrode layers can be made by a known method using a carbon material such as activated carbon, for example. In this case, for example, the carbon material is pulverized into a size of about 5 to 100 μm, and the granularity of the resulting particles is adjusted. Thus obtained carbon material is dissolved in a solvent, for example, together with a conductive auxiliary agent (carbon black or the like) for imparting conductivity to carbon powder and a binder (polytetrafluoroethylene which will hereinafter be referred to as PTFE), so as to produce a coating liquid (slurry), which is applied to the collector layers and collector terminal layers as in the first embodiment, and then is dried, whereby the anodes 20 and cathodes 10 can be formed.

Here, not only carbon black but also powdery graphite or the like can be used as the conductive auxiliary agent, whereas not only PTFE but also PVDF, PE, PP, fluorine rubber, and the like can be used as the binder.

Such an electric double layer capacitor yields operations and effects similar to those in the first embodiment.

EXAMPLES

In the following, the electrochemical device in accordance with the present invention will be explained in further detail with reference to Examples and Comparative Examples, which do not restrict the present invention at all.

In the following manner, lithium ion secondary batteries in accordance with Examples 1 to 5 and Comparative Examples 1 and 2 were produced.

Example 1

(1) Making of Electrode Layer

Cathodes (polarizable electrodes) were made in the following manner. First, $LiCoO_2$ as a cathode active material, carbon black and graphite as conductive auxiliary agents, and Kynar Flex 741 (PVDF homopolymer particle manufactured by Elf Atochem, having a weight-average molecular weight Mw of $5.5 \times 10^5$ and an average particle size of 0.2 µm, soluble in N-methyl-2-pyrrolidone (NMP)) were prepared, and were compounded such that the weight ratio of cathode active material/conductive auxiliary agent (carbon black)/conductive auxiliary agent (graphite)/binder=90:3:3:4. Thus compounded mixture was put into NMP acting as a solvent, and they were kneaded, so as to prepare a cathode coating liquid (slurry). NMP was added with its amount adjusted such that the weight ratio of NMP/binder=94:6.

Next, aluminum foils (two with a thickness of 60 µm and four with a thickness of 40 µm) were prepared. For each of the aluminum foils having a thickness of 60 µm, the cathode coating liquid was uniformly applied onto one face. For each of the aluminum foils having a thickness of 20 µm, the cathode coating liquid was uniformly applied to both faces. Thereafter, the aluminum foils were dried, and then were cut into rectangles (each having a size of 2 cm×3 cm), so as to produce two two-layer laminates each having a configuration of collector layer/positive electrode (corresponding to (a) of FIG. 4) and four cathode three-layer laminates each having a configuration of positive electrode/collector layer/positive electrode (corresponding to (b) of FIG. 4).

Subsequently, anodes (polarizable electrodes) were made in the following manner. First, mesocarbon microbeads (MCMB; synthetic graphite) as an anode active material, carbon black as a conductive auxiliary agent, and Kynar Flex 741 as a binder were prepared, and were compounded such that the weight ratio of cathode active material/conductive auxiliary agent (carbon black)/conductive auxiliary agent (graphite)/binder=87:3:10. Thus compounded mixture was put into NMP acting as a solvent, and they were kneaded, so as to prepare an anode coating liquid (slurry). NMP was added with its amount adjusted such that the weight ratio of NMP/binder=93:7.

Next, five copper foils (each having a thickness of 10 µm) were prepared. For each of the five foils, the anode coating liquid was uniformly applied to both faces. After drying, the foils were cut into rectangles (each having a size of 2.2 cm×3.2 cm), so as to produce five anode three-layer laminates each having a configuration of negative electrode/collector layer/negative electrode (corresponding to (c) of FIG. 4).

(2) Making of Separator Layer

First, Kynar Flex 741 as a polymer particle and Kynar Flex 2851 as a binder (manufactured by Elf Atochem, in which VDF/HFP=95:5 (weight ratio)) were prepared, and were compounded such that the weight ratio of polymer particle/binder=90:10. To 1 part by weight of thus obtained mixture, 2.4 parts by weight of a solvent [acetone/toluene=8.9:1.1 (weight ratio)] were added; and they were mixed at a temperature of 30 to 40° C. with a homogenizer. The resulting liquid (slurry) was applied onto a polyethylene terephthalate (PET) film by doctor blading, and then the solvent was evaporated within the temperature range from room temperature to 120° C., so as to yield a porous sheet for separator layers. Thereafter, the sheet was cut into rectangles (each having a size of 2.4 cm×3.4 cm), so as to produce 10 separator layers. Here, the thickness (dried thickness) of each separator layer was set to 30 µm. The porosity of the separator layer measured by Archimedes' method was 40%.

(3) Making of Lithium Ion Secondary Battery

In thus obtained (two) two-layer laminates and three-layer laminates (five for anodes and four for cathodes), an ionic liquid (having a viscosity of $60 \times 10^{-3}$ Pa·s at 25° C.) represented by general formula (8) was applied like a spot near the center of the electrode layer surface of each sheet. The area to which the ionic liquid was applied was 3% by area of the sheet surface.

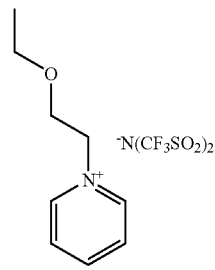

(8)

Subsequently, the two-layer laminate, separator layer, anode three-layer laminate, separator layer, cathode three-layer laminate, separator layer, anode three-layer laminate, . . . , anode three-layer laminate, separator layer, and two-layer laminate were bonded together in this order, so that the adhesive force of the ionic liquid temporarily bonded the laminates and separator layers.

An elongated aluminum foil and an elongated nickel foil were welded to positive and negative electrode tabs, respectively, so as to take out leads, and then the laminate was dipped into an electrolytic solution (1-M $LiPF_6$/EC+DMC [EC/DMC=1:2 (volume ratio)]).

After an excess of the electrolytic solution was eliminated from the laminate, the latter was encapsulated into an aluminum laminate pack and was pressed at a temperature of 70 to 90° C., so as to thermocompression-bond the sheets in the laminate, thus making the lithium ion secondary battery in accordance with Example 1.

Example 2

The lithium ion secondary battery in accordance with Example 2 was made as in Example 1 except that the compound (having a viscosity of $35 \times 10^{-3}$ Pa·s at 25° C.) represented by general formula (9) was used as the ionic liquid.

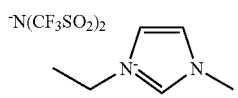

(9)

Example 3

The lithium ion secondary battery in accordance with Example 3 was made as in Example 1 except that the compound (having a viscosity of 90×10⁻³ Pa·s at 25° C.) represented by general formula (10) was used as the ionic liquid.

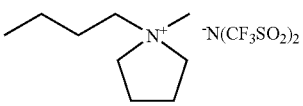

(10)

Example 4

The lithium ion secondary battery in accordance with Example 4 was made as in Example 1 except that the compound (having a viscosity of 210×10⁻³ Pa·s at 25° C.) represented by general formula (11) was used as the ionic liquid.

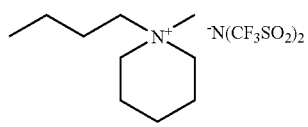

(11)

Example 5

The lithium ion secondary battery in accordance with Example 5 was made as in Example 1 except that the compound (having a viscosity of 630×10⁻³ Pa·s at 25° C.) represented by general formula (12) was used as the ionic liquid.

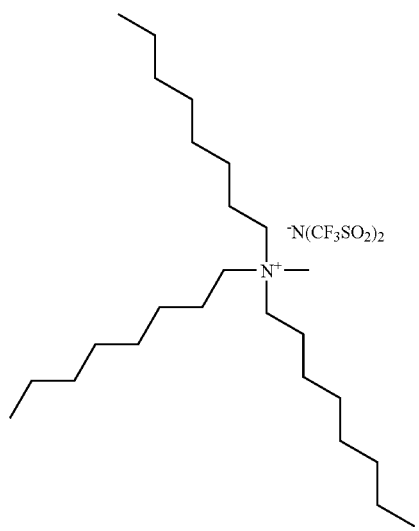

(12)

Comparative Example 1

The lithium ion secondary battery in accordance with Comparative Example 1 was made as in Example 1 except that, instead of the ionic liquid, a hot-melt adhesive (ethylene/methacrylic acid copolymer) was used for securing the individual layers under pressure while being heated to 110° C.

Comparative Example 2

The lithium ion secondary battery in accordance with Comparative Example 2 was made as in Example 1 except that no ionic liquid was used, i.e., the two-layer laminates, three-layer laminates (for anodes and cathodes), and separator layers were not temporarily bonded.

Subsequently, in the following procedure, electric double layer capacitors in accordance with Examples 6 to 10 and Comparative Examples 3 and 4 were made.

Example 6

The electric double layer capacitor in accordance with Example 6 was made as in Example 1 except that the laminate structure made as follows was used.

Activated carbon electrodes having the same ingredients were used as the anodes and cathodes. First, fibrous steam-activated carbon as an active material, carbon black and graphite as conductive auxiliary agents, and Kynar Flex 741 (PVDF homopolymer particle manufactured by Elf Atochem, having a weight-average molecular weight Mw of 5.5×10⁵ and an average particle size of 0.2 μm, soluble in N-methyl-2-pyrrolidone (NMP)) were prepared, and were compounded such that the weight ratio of cathode active material/conductive auxiliary agent (carbon black)/conductive auxiliary agent (graphite)/binder=85:3:3:9. Thus compounded mixture was put into NMP acting as a solvent, and they were kneaded, so as to prepare a cathode coating liquid. NMP was added with its amount adjusted such that the weight ratio of NMP/binder=94:6.

Next, 11 aluminum foils (2 with a thickness of 60 μm and 9 with a thickness of 20 μm) were prepared. For each of the aluminum foils having a thickness of 60 μm, the coating liquid was applied uniformly onto one face. For each of the aluminum foils having a thickness of 20 μm, the coating liquid was applied uniformly onto both faces. Thereafter, the aluminum foils were dried, and then were cut into rectangles, so as to produce two two-layer laminates each having a configuration of collector layer/electrode layer and nine three-layer laminates each having a configuration of electrode layer/collector layer/electrode layer.

In thus obtained two-layer laminates and three-layer laminates, the ionic liquid used in Example 1 was applied like a spot near the center of the electrode layer surface of each sheet.

Subsequently, the two-layer laminate, separator layer, three-layer laminate, separator layer, three-layer laminate, separator layer, three-layer laminate, . . . , three-layer laminate, separator layer, and two-layer laminate were bonded together in this order, so that the adhesive force of the ionic liquid temporarily bonded the laminates and separator layers.

Example 7

The electric double layer capacitor in accordance with Example 7 was made as in Example 6 except that the ionic liquid represented by general formula (9) was used.

Example 8

The electric double layer capacitor in accordance with Example 8 was made as in Example 6 except that the ionic liquid represented by general formula (10) was used.

Example 9

The electric double layer capacitor in accordance with Example 9 was made as in Example 6 except that the ionic liquid represented by general formula (11) was used.

Example 10

The electric double layer capacitor in accordance with Example 10 was made as in Example 6 except that the ionic liquid represented by general formula (12) was used.

Comparative Example 3

The electric double layer capacitor in accordance with Comparative Example 3 was made as in Example 6 except that, instead of the ionic liquid, a hot-melt adhesive (ethylene/methacrylic acid copolymer) was used for securing the individual layers under pressure while being heated to 110° C.

Comparative Example 4

The lithium ion secondary battery in accordance with Comparative Example 4 was made as in Example 6 except that no ionic liquid was used, i.e., the two-layer laminates, three-layer laminates, and separator layers were not temporarily bonded.

Next, charging/discharging characteristics of thus obtained lithium ion secondary batteries in accordance with Examples 1 to 5 and Comparative Examples 1 and 2 and electric double layer capacitors in accordance with Examples 6 to 10 and Comparative Examples 3 and 4 were evaluated.

First, the initial charging/discharging efficiency (initial charging/discharging ratio), initial discharging capacity, and cycle characteristic were evaluated in the lithium ion secondary batteries in accordance with Examples 1 to 5 and Comparative Examples 1 and 2. With the charging/discharging current of 1 C, the charging was performed by a fixed-current/low-voltage method (with the charging time of 1.5 hr) up to 4.2 V, whereas the discharging was effected by a fixed-current method to 2.8 V. FIG. 7 shows the charging/discharging efficiency calculated by [(initial discharging capacity)/(initial charging capacity)]×100 as the initial charging/discharging efficiency, the capacity with reference to the discharging capacity of Comparative Example 1 taken as 100, and the cycle number at which the discharging capacity became 80% or less of the initial discharging capacity as the cycle characteristic.

As can be seen from FIG. 7, the initial charging/discharging efficiency, initial discharging capacity, and cycle characteristic were lower in Comparative Examples 1 and 2 than in Examples 1 to 5. Namely, the use of the ionic liquid appears to improve the energy capacity and durability of lithium ion secondary batteries.

Next, the initial charging/discharging efficiency (initial charging/discharging ratio), initial discharging capacity, and cycle characteristic were evaluated in the electric double layer capacitors in accordance with Examples 6 to 10 and Comparative Examples 3 and 4. With the charging/discharging current of 5 C, the charging was performed by a fixed-current method (with the charging time of 1.5 hr) up to 2.5 V, whereas the discharging was effected by a fixed-current method to 1.5 V. FIG. 7 shows the capacity with reference to the discharging capacity of Comparative Example 3 taken as 100 and the capacity retention ratio of (discharging capacity at the 100th cycle)/(initial discharging capacity) as the cycle characteristic. The initial charging/discharging efficiency was at a value not practically problematic in each of Comparative Examples 3 and 4.

As can be seen from FIG. 7, the initial discharging capacity and cycle characteristic were lower in Comparative Examples 3 and 4 than in Examples 6 to 10. Namely, the use of the ionic liquid appears to improve the energy capacity and durability of electric double layer capacitors.

What is claimed is:

1. A method of making an electrochemical device including an electrochemical element comprising a pair of opposing electrode layers, a separator layer disposed between the pair of electrode layers, and an electrolyte existing between the pair of electrode layers;

the method comprising the steps of:
(1) applying an ionic liquid to at least one of the electrode and separator layers, and
(2) laminating the electrode and separator layers, wherein the ionic liquid temporarily binds at least one of the electrode and separator layers.

2. A method of making an electrochemical device according to claim 1, wherein the ionic liquid has a viscosity of 35 to $630 \times 10^{-3}$ Pa·s.

3. A method of making an electrochemical device according to claim 1, wherein the ionic liquid is a salt containing a quaternary ammonium cation.

4. A method of making an electrochemical device according to claim 3, wherein the quaternary ammonium cation contains at least one of a cation having a structure of $R_4N^+$ where R is an organic group, pyrrolidinium cation, piperidinium cation, imidazolium cation, and pyridinium cation.

5. A method of making an electrochemical device according to claim 1, wherein the ionic liquid is a salt containing a trifluoromethanesulfonyl imide anion.

6. A method of making an electrochemical device according to claim 1, wherein at least one of the pair of electrode layers contains a lithium compound; and wherein the ionic liquid is a salt containing a lithium ion.

* * * * *